(12) United States Patent
Chen et al.

(10) Patent No.: US 10,684,644 B2
(45) Date of Patent: Jun. 16, 2020

(54) CLAMSHELL ELECTRONIC DEVICE

(71) Applicant: CHICONY ELECTRONICS CO., LTD., New Taipei (TW)

(72) Inventors: Tsung-Min Chen, New Taipei (TW); Ming-Cheng Yang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 15/983,727

(22) Filed: May 18, 2018

(65) Prior Publication Data
US 2019/0196542 A1    Jun. 27, 2019

Related U.S. Application Data

(60) Provisional application No. 62/610,370, filed on Dec. 26, 2017.

(51) Int. Cl.
*G06F 1/16* (2006.01)

(52) U.S. Cl.
CPC .......... *G06F 1/1616* (2013.01); *G06F 1/1681* (2013.01)

(58) Field of Classification Search
CPC .... G06F 1/1616; G06F 1/1681; G06F 1/1669; G06F 1/1618
USPC ........................................ 361/679.17, 679.27
See application file for complete search history.

(56) References Cited

U.S. PATENT DOCUMENTS

| | | | | |
|---|---|---|---|---|
| 5,552,960 A * | 9/1996 | Nelson | ................... | G06F 1/203 165/104.33 |
| 6,480,373 B1 * | 11/2002 | Landry | ................ | G06F 1/1616 16/308 |
| 7,280,345 B2 * | 10/2007 | Park | ........................ | G06F 1/181 361/679.01 |
| 9,740,253 B2 * | 8/2017 | Cheng | ..................... | G06F 1/203 |
| 2004/0259593 A1 * | 12/2004 | Wang | .................... | G06F 1/1616 455/556.1 |
| 2006/0256512 A1 * | 11/2006 | Esther Kang | ........... | G06F 1/162 361/679.05 |
| 2007/0054636 A1 * | 3/2007 | Ahn | ...................... | H04M 1/022 455/128 |
| 2008/0144262 A1 * | 6/2008 | Lai | ........................ | G06F 1/1616 361/679.17 |
| 2008/0174943 A1 * | 7/2008 | Hirasawa | .............. | G06F 1/1616 361/679.27 |
| 2014/0347805 A1 * | 11/2014 | Wang | .................... | G06F 1/1637 361/679.27 |

FOREIGN PATENT DOCUMENTS

| | | |
|---|---|---|
| TW | 424899 | 3/2001 |
| TW | I314431 | 9/2009 |

* cited by examiner

*Primary Examiner* — Daniel P Wicklund
*Assistant Examiner* — Sagar Shrestha
(74) *Attorney, Agent, or Firm* — Muncy, Geissler, Olds & Lowe, P.C.

(57) ABSTRACT

A clamshell electronic device is disclosed. The clamshell electronic device includes a first cover, a second cover and a pivoting element. The second cover system is provided to dispose a first input module or a second input module, wherein the first input module and the second input module have different heights. The pivoting element connects the first cover and the second cover to allow the first cover and the second cover to rotate with each other. When the second cover is disposed with the first input module or the second input module, the pivoting element can be adjusted to a first use state and a second use state.

5 Claims, 4 Drawing Sheets

CLAMSHELL ELECTRONIC DEVICE

BACKGROUND OF THE INVENTION

1. Field of the Invention

The present invention relates to a clamshell electronic device, particularly to a clamshell electronic device that can be cooperated with an input module to achieve height adjustment.

2. Description of the Related Art

With the progress of the times, the application of clamshell electronic devices such as notebook computers has become more and more diverse. In today's technologies, notebook computers can also be designed with a replaceable input module to meet different needs. However, after the input module is replaced, the clamshell electronic device may not be opened and closed smoothly due to changes in the thickness of the input module.

Accordingly, it is necessary to devise a new clamshell electronic device to overcome the shortcoming in the prior art.

SUMMARY OF THE INVENTION

It is a major objective of the present invention to provide a clamshell electronic device which has the effect of height adjustment through cooperation with an input module.

To achieve the above objective, the present invention provides a clamshell electronic device, including a first cover, a second cover, and a pivoting element. The second cover can be provided to dispose a first input module or a second input module, wherein the first input module and the second input module have different heights. The pivoting element connects the first cover and the second cover to allow the first cover and the second cover to rotate with each other. Specifically, when the second cover is disposed with the first input module or the second input module, the pivoting element can be adjusted to a first use state and a second use state.

The present invention further provides a clamshell electronic device, which includes a first cover, a second cover, and a pivoting element. The pivoting element connects the first cover and the second cover to allow the first cover and the second cover to rotate with each other, and thus it can be adjusted to the first use state and the second use state.

DETAILED DESCRIPTION OF THE PREFERRED EMBODIMENT

Hereafter, the technical content of the present invention will be better understood with reference to preferred embodiments.

Figure 1:
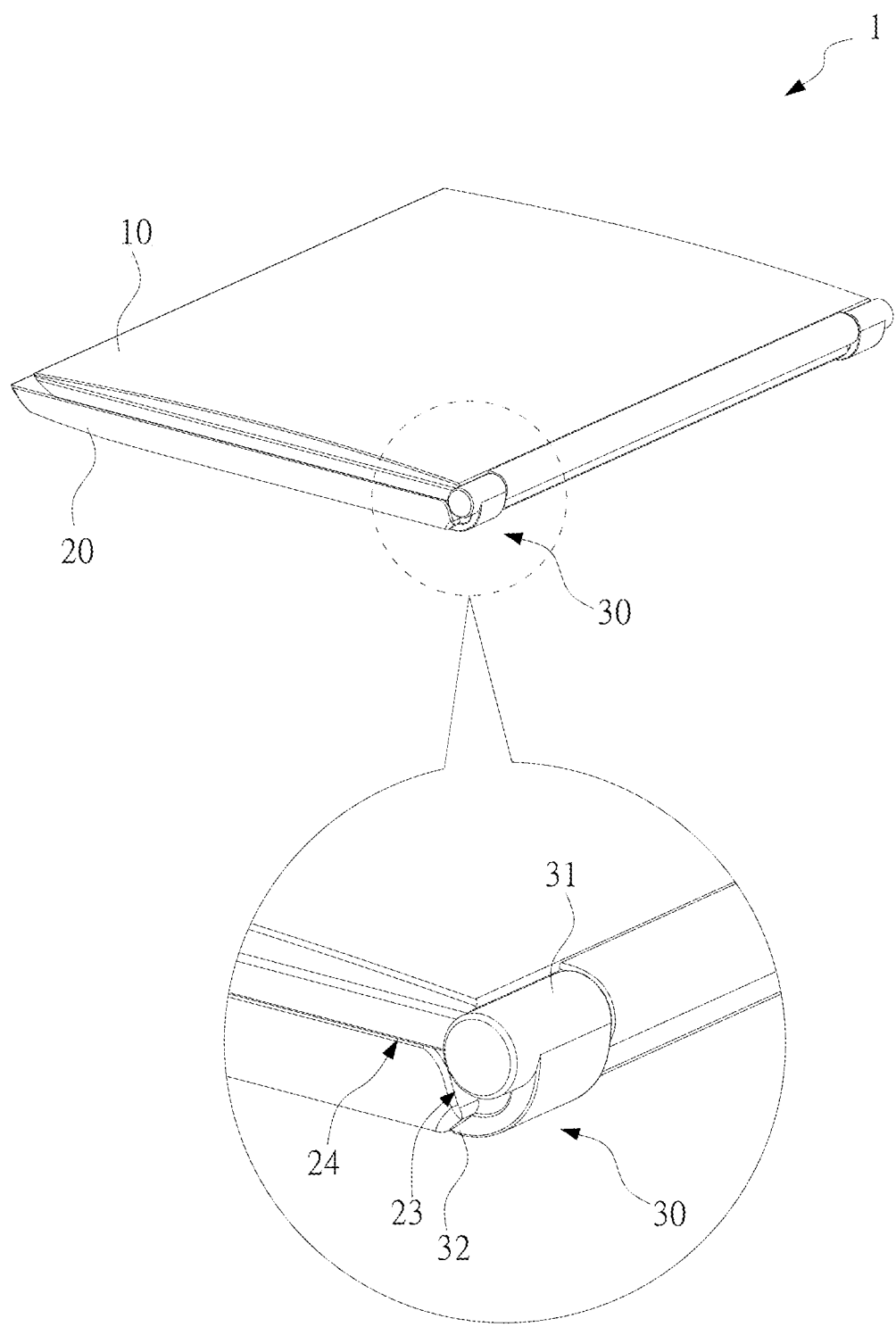
FIG. 1 is an architecture diagram showing a clamshell electronic device in a first use state according to the present invention.
Figure 2:
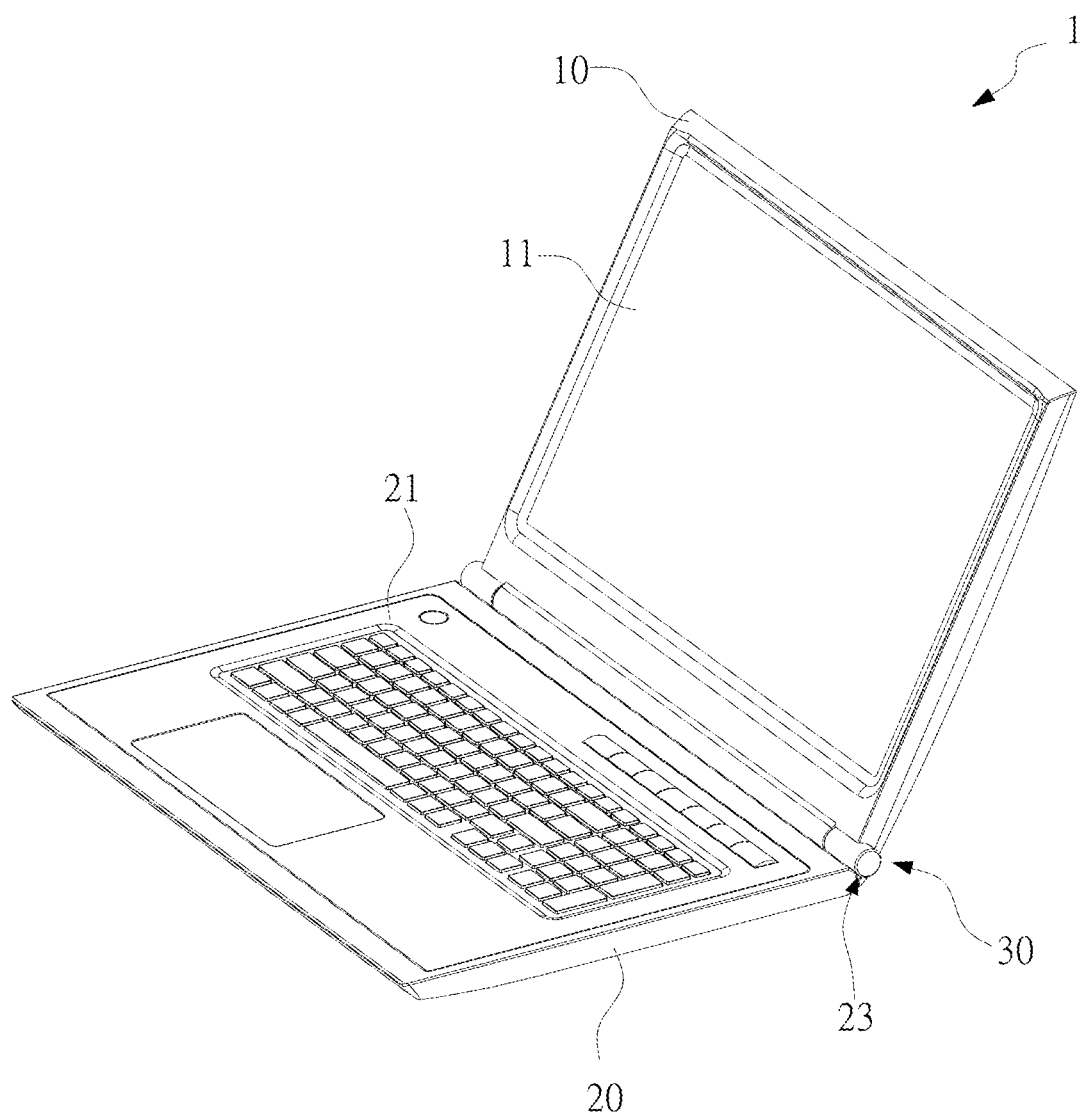
FIG. 2 is a schematic diagram showing the open state of the clamshell electronic device in the first use state according to the present invention.

Hereafter, please first refer to FIG. 1 for an architecture diagram showing a clamshell electronic device in a first use state according to the present invention and to FIG. 2 for a schematic diagram showing the open state of the clamshell electronic device in the first use state according to the present invention.

In an embodiment of the present invention, the clamshell electronic device 1 may be a notebook computer or a handheld game device, but the present invention is not limited thereto. The clamshell electronic device 1 includes a first cover 10, a second cover 20, and a pivoting element 30 connecting the first cover 10 and the second cover 20. In the present embodiment, the first cover 10 can be provided with a display screen 11, but the present invention is not limited thereto. The second cover 20 can be provided to dispose an input module. In the present embodiment, the second cover 20 disposed with a first input module 21 (as shown in FIGS. 1 and 2) or a second input module 22 (as shown in FIGS. 3 and 4) is used as an example for illustration, wherein the first input module 21 and the second input module 22 have different heights.

The pivoting element 30 connects the first cover 10 and the second cover 20 such that the first cover 10 and the second cover 20 can rotate with each other. Also, when the second cover 20 is disposed with the first input module 21 or the second input module 22, the pivoting element 30 can be adapted to the height of the first input module 21 or the second input module 22 to be adjusted to a first use state and a second use state. In other embodiments of the present invention, the pivoting element 30 can be adapted to the heights of different input modules to achieve multi-level opening and closing, but the present invention is not limited to only two height adjustments. In an embodiment of the present invention, the pivoting element 30 looks like a C shape and includes a first pivoting portion 31 and a second pivoting portion 32. The first pivoting portion 31 is pivoted to the first cover 10, and the second pivoting portion 32 is pivoted to the second cover 20. Therefore, the pivoting element 30 is used for opening and closing the first cover 10 and the second cover 20 by the first pivoting portion 31, and the second pivoting portion 32 is used for adjusting the height.

When the pivoting element 30 is in the first use state, that is, when the second cover 20 is provided to dispose a lower first input module 21, the pivoting element 30 can be rotated by the second pivoting portion 32 such that the first pivoting portion 31 can be moved to a first position 23. Specifically, the second position 24 is higher than the first position 23. The first pivoting portion 31 may also be first on the first position 23. As a result, the first cover 10 is lowered to a first height. In the present embodiment, the second cover 20 includes an upper surface and a side. The side is adjacent to the upper surface, and the second pivoting portion 32 is connected to the side. Specifically, the first position 23 is located at the side, and the second position 24 is located at the upper surface. Preferably, the angle between the upper surface and the side is greater than 90°, but the present invention is not limited thereto.

Figure 3:
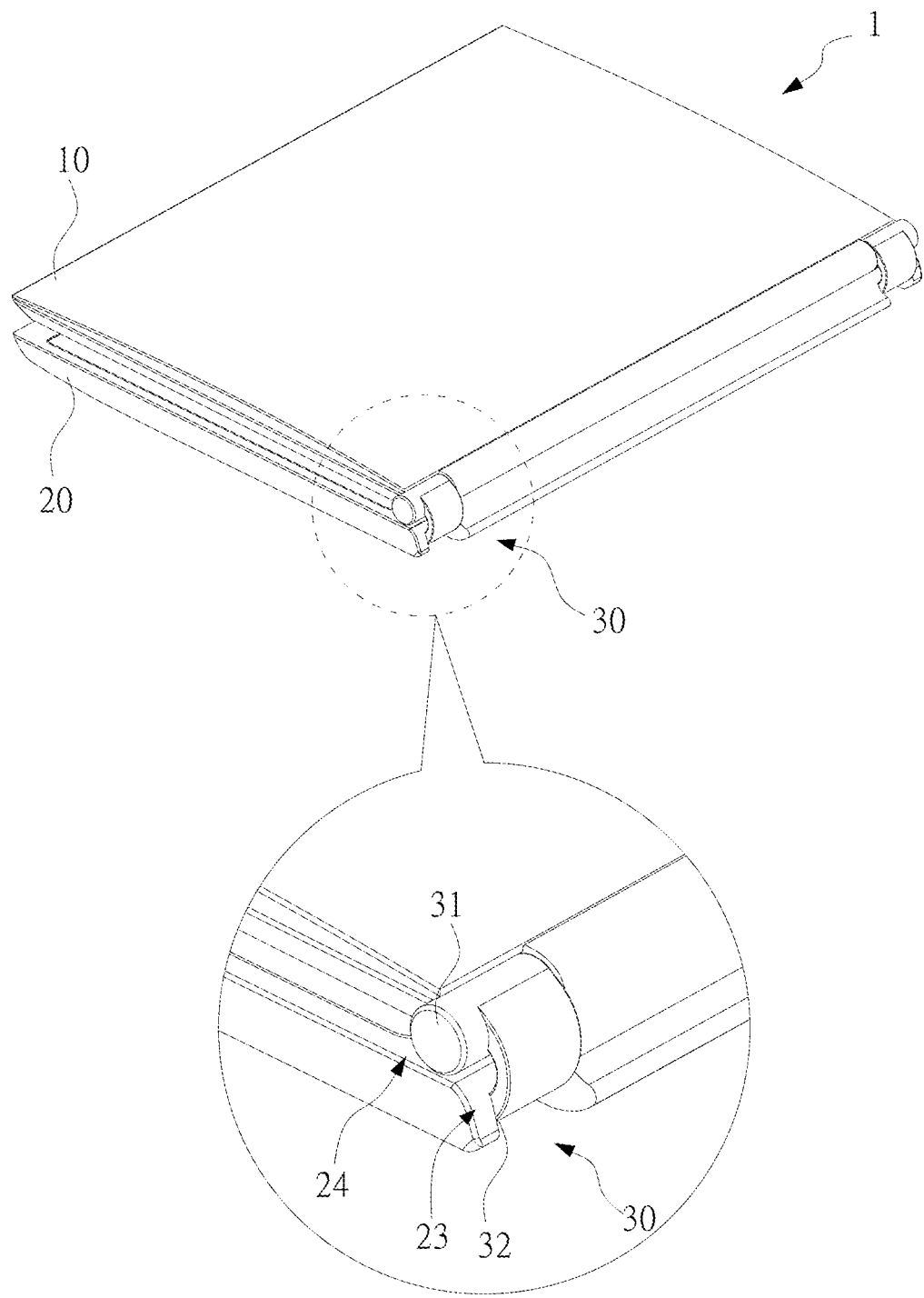
FIG. 3 is an architecture diagram showing a clamshell electronic device in a second use state according to the present invention.
Figure 4:
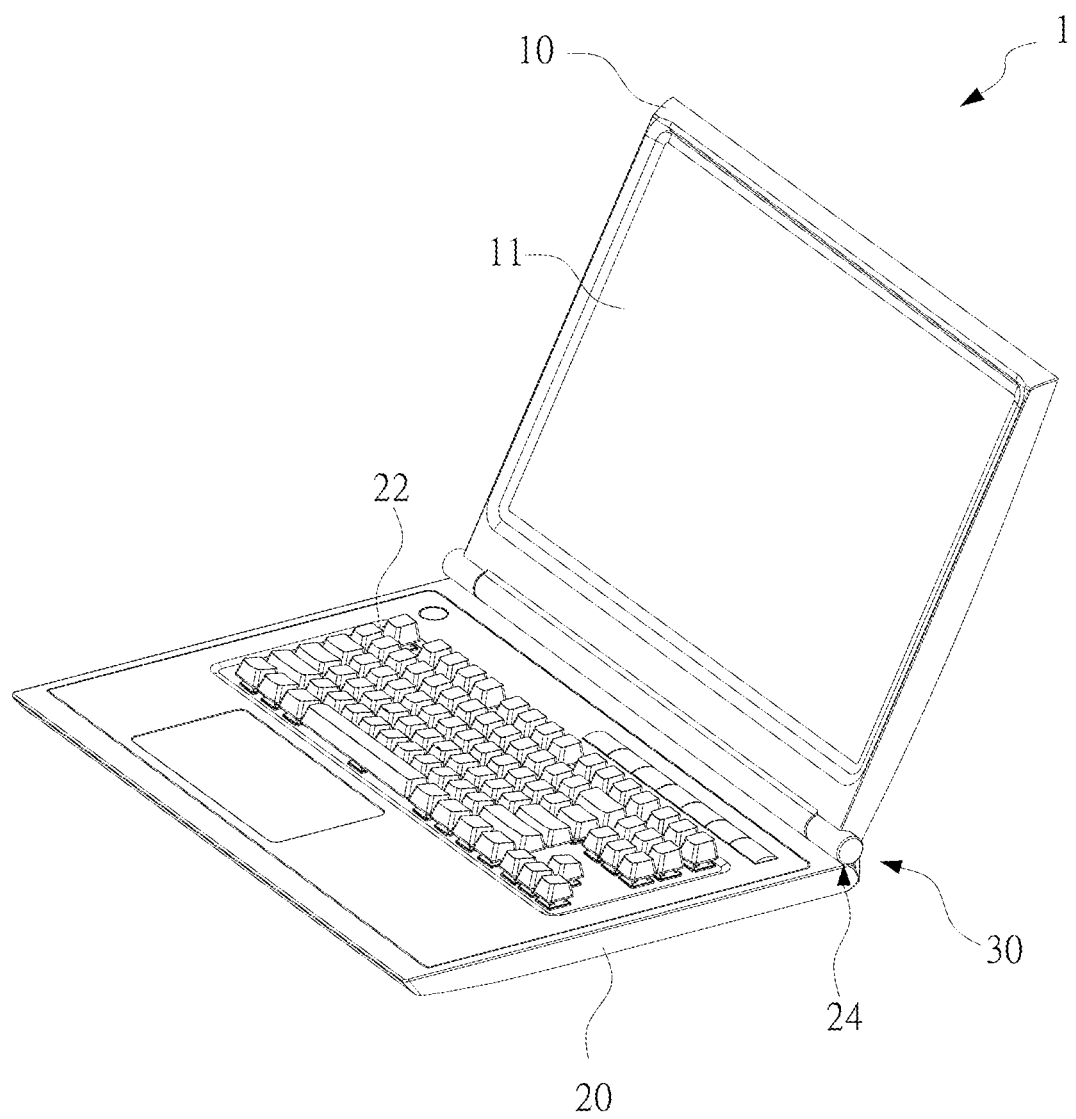
FIG. 4 is a schematic diagram showing the open state of the clamshell electronic device in the second use state according to the present invention.

Hereafter, please also refer to FIG. 3, which is an architecture diagram showing a clamshell electronic device in a second use state according to the present invention, and to FIG. 4, which is a schematic diagram showing the open state of the clamshell electronic device in the second use state according to the present invention.

When the pivoting element 30 is in the second use state, that is, when the second cover 20 is provided to dispose a higher second input module 221, the pivoting element 30 can be rotated by the second pivoting portion 32 such that the first pivoting portion 31 can be moved to the second position 24. As a result, the first cover 10 is raised to a second height to fit the higher second input module 221.

As can be seen, in the clamshell electronic device 1 of the present invention, the height of closing the first cover 10 can be adjusted by the pivoting element 30 according to the height of the input module disposed by the second cover 20.

It should be noted that the preferred embodiments of the present invention described above are only illustrative. To avoid redundancy, not all the possible combinations of changes are documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on varying needs. Other modules or elements may not necessarily exist between two of any modules. Such modifications can be performed without departing from the scope of the invention as defined solely by the appended claims.

What is claimed is:

1. A clamshell electronic device, comprising:
   a first cover;
   a second cover, disposed with a first input module or a second input module, wherein the first input module and the second input module have different heights; and
   a pivoting element, which connects the first cover and the second cover to allow the first cover and the second cover to rotate with each other for adjusting a distance between the first cover and the second cover, wherein the pivoting element includes a first pivoting portion and a second pivoting portion; the first pivoting portion is pivoted to the first cover for opening and closing the first cover and the second cover, and the second pivoting portion is pivoted to the second cover, wherein when the second cover is disposed with the first input module, the pivoting element can be adjusted to a first use state so as to move the first pivoting portion to a first position of the second cover to lower the first cover to a first height while the first cover and the second cover are in the closed state, wherein when the second cover is disposed with the second input module, the pivoting element can be adjusted to the second use state so as to move the first pivoting portion to a second position of the second cover to raise the first cover to a second height, wherein the second position is higher than the first position, thus the height of closing the first cover can be adjusted by the pivoting element.

2. The clamshell electronic device as claimed in claim 1, wherein when the pivoting element is in the first use state, the pivoting element is rotated by the second pivoting portion such that the first pivoting portion is moved to the first position.

3. The clamshell electronic device as claimed in claim 1, wherein when the pivoting element is in the second use state, the pivoting element is rotated by the second pivoting portion such that the first pivoting portion is moved to the second position.

4. The clamshell electronic device as claimed in claim 1, wherein the second cover includes an upper surface and a side; wherein at the first position, the first cover lies at or near the side of the second cover and at the second position, the first cover is at the upper surface of the second cover.

5. The clamshell electronic device as claimed in claim 4, wherein the angle between the upper surface and the side is greater than 90°.

\* \* \* \* \*